R. T. GRIFFITHS.
METHOD OF MANUFACTURING PLAYING BALLS.
APPLICATION FILED FEB. 28, 1917.

1,240,439.    Patented Sept. 18, 1917.

Inventor:
Richard T. Griffiths,
Atty's.

UNITED STATES PATENT OFFICE.

RICHARD T. GRIFFITHS, OF AKRON, OHIO, ASSIGNOR TO THE MILLER RUBBER COMPANY, A CORPORATION OF OHIO.

METHOD OF MANUFACTURING PLAYING-BALLS.

1,240,439.  Specification of Letters Patent.  Patented Sept. 18, 1917.

Application filed February 28, 1917.  Serial No. 151,615.

*To all whom it may concern:*

Be it known that I, RICHARD T. GRIFFITHS, a citizen of the United States, and resident of Akron, Ohio, have invented certain new and useful Improvements in Methods of Manufacturing Playing-Balls, of which the following is a specification.

My present invention relates to an improved method of manufacturing playing balls and more particularly to the manufacture of golf balls.

It has been the former practice in the manufacture of golf balls, in which a hollow center or core was used, to first form a hollow center or core of material impervious to gas or liquids and to afterward wind upon this hollow center a winding of yarn or rubber thread which would prevent the expansion of the hollow center. The hollow center or core was then charged to a high pressure with a gas or liquid by use of a hypodermic needle inserted through the winding and into the interior of the hollow center.

A chance was taken that the material of the hollow center or core would close up the opening pierced by the hypodermic needle and would retain the compressed gas or liquid until a covering material, such as gutta percha, could be molded over the winding material.

The present invention aims to produce a ball from which is eliminated all liability of leakage and which will be more effective and of a more uniform nature and the invention includes the novel method hereinafter described and defined by the appended claim.

Figure 1:
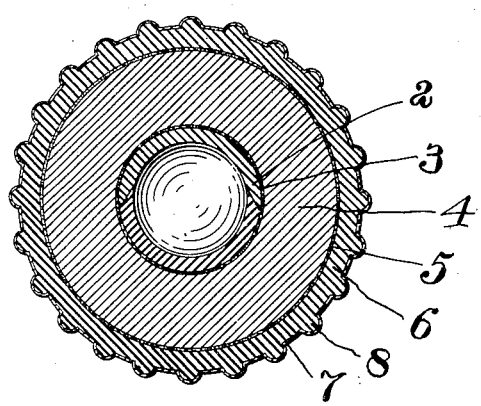
Figure 2:
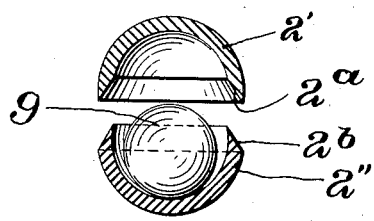

In order that my invention may be better understood reference is made to the accompanying drawings, in which, Figure 1 is a cross section of the finished ball and Fig. 2 represents the assembling of the hollow center or core.

This center or core, which is designated in Fig. 1 by the numeral 2 may be made from vulcanizable rubber or other impervious materials such as gelatin, celluloid or condensite, and may be preferably formed in sections, which will fit together to form a hollow sphere. In Fig. 2 I have shown one method by which this hollow center or core may be made, although I do not wish to restrict myself to this method. In this method I have shown the center formed of two parts represented by the numerals 2', 2'', these parts having male and female meeting edges 2ª and 2ᵇ. In case I form this hollow center or core of rubber I first form the parts 2', 2'' in separate molds, the parts being only partially vulcanized, and afterward apply a coat of cement to the surfaces 2ª, 2ᵇ, and press the two halves together. I may also choose to form the halves, vulcanizing them completely, and unite them by acid curing cement.

Also in case I wish to form this center or core from celluloid I may use a celluloid cement in uniting these sections. With other materials I may use suitable cements, or in case the substance may be easily united by heating at a very low temperature or by locally applying heat so as not to heat the entire article I may make use of this method of uniting the sections.

For filling this hollow center or core with gas under pressure I make use of the pellet designated by the numeral 9 from ammonium nitrite or a mixture of ammonium chlorid and sodium nitrite inserted within the hollow center before the parts are brought together, and united in the manner described. Where heat is necessary to unite parts 2, 2' of the hollow center or core, said heat is applied locally or by such low temperature as not to decompose the ball 9. Thereafter, the hollow center or core 2 is coated with a coating 3 of cement and is provided with a winding 4 thereabout. This winding 4 may be formed of vulcanized rubber thread uniformly wound or of cotton or linen thread or other yarn which may or may not be previously impregnated with a rubber solution, or other cementing material. After this winding has been completed a coating 5 of cement or rubber is applied to the surface of this winding and upon this is formed or applied a cover 6 of gutta percha or other suitable covering material, and the entire ball is then placed in a mold of suitable size and contour, and coating heated for the purpose of forming or hardening the coating upon the ball. The mold used may be ornamented in any manner in order to give the ball a suitable surface configuration, as for example the nodules 8 projected therefrom, as shown in Fig. 1.

The heat of the mold used for molding the outer covering of gutta percha, or other suitable material, is of sufficient temperature and the ball is kept in this mold for a sufficient length of time, for said heat to penetrate to the center of the ball, and decompose the pellet 9, generating a gas within the hollow center under extremely high presure, which not only causes the hollow center or core to be extremely elastic but at the same time places the winding 4 under strain. After the ball is removed from the mold it is given a coating 7 of rubber paint, preferably of white color.

Having thus described my invention what I claim is:

The hereindescribed method of manufacturing golf balls and the like, which consists in forming a spherical core of sections, uniting said sections with an inclosed material capable of gasifying under heat, applying to said core a winding of textile material, surrounding said textile material with a vulcanizable cover, and heating said ball in a mold sufficiently to effect vulcanization and gasify the material in the cover.

RICHARD T. GRIFFITHS.